United States Patent
Cruz et al.

(10) Patent No.: US 6,976,241 B2
(45) Date of Patent: Dec. 13, 2005

(54) CROSS PLATFORM ADMINISTRATIVE FRAMEWORK

(75) Inventors: John M. Cruz, Parsippany, NJ (US); Smitha Lahiri, Clifton, NJ (US); Xiao H. Ling, Parsippany, NJ (US); William R. Klotz, Stanhope, NJ (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 09/987,478

(22) Filed: Nov. 14, 2001

(65) Prior Publication Data

US 2003/0093582 A1 May 15, 2003

(51) Int. Cl.[7] ................................. G06F 9/44
(52) U.S. Cl. .................. 717/102; 717/121; 719/329
(58) Field of Search .................. 719/311, 318–321, 719/328–329; 717/100–123

(56) References Cited

FOREIGN PATENT DOCUMENTS

EP        1014748 A2 *  6/2000    ............ H04Q/11/04

OTHER PUBLICATIONS

Marchetti et al., "Integrating Autonomous Enterprise Systems through Dependable CORBA Objects", IEEE, pp.: 204–211, Mar. 2001.*

Kon et al., "Monitoring, Security, and Dynamic Configuration with the dynamicTAO Reflective ORB", ACM, pp.: 121–143, 2000.*

* cited by examiner

*Primary Examiner*—Ted T. Vo
(74) *Attorney, Agent, or Firm*—Pillsbury Winthrop Shaw Pittman LLP

(57) ABSTRACT

An event service system includes an administrative framework utilizing CORBA interfaces, an administrative system interface coupled to the administrative framework, and at least one language-specific interface coupled to the administrative system interface and configured to provide a mechanism for communication between the administrative system interface and a customer administration application. The administrative system interface is configured to enable clients to manage the event service system. The administrative framework includes a system administrative subsystem, a data management subsystem, and an event service framework.

21 Claims, 17 Drawing Sheets

CROSS PLATFORM ADMINISTRATIVE FRAMEWORK

FIELD OF THE INVENTION

The present invention is related to cross platform administrative framework in a system for providing various services. More specifically, the present invention is related to architectural mechanisms for administrative software for performing administration, configuration, system initialization, fault monitoring and event notification in such a system.

BACKGROUND OF THE INVENTION

Presently, Windows NT™ is the only operating system with any type of architecture. However, the Windows NT™ framework is operating system specific and cannot be converted or extended to the Unix operating system.

The Common Object Request Broker Architecture (CORBA) is an architecture and specification standard for creating, distributing, and managing distributed program objects in a network. CORBA is a software backend architecture. CORBA allows programs at different locations and developed by different vendors to communicate in a network through an "interface broker." The International Organization for Standardization (ISO) has sanctioned CORBA as the standard architecture for distributed software objects (which are also known as network components).

One essential concept in CORBA is the Object Request Broker (ORB). ORB support in a network of clients and servers on different computers means that a client program (which may itself be a network component) can request a service (e.g., a collection of cohesive software functions that together present a server-like capability to multiple clients; services may be, for example, remotely invokable by its clients) from a server program or object without regard for its physical location or its implementation. A service may be thought of as a software program that provides specific functionality. For example, the term network services may refer to software programs that transmit data or provide for conversion of data in a network. Similarly, database services may provide for the storage and retrieval of data in a database. In CORBA, the ORB is the software that acts as a "broker" between a client request for a service from a distributed software object or network component and the completion of that request. In this way, network components can find out about each other and exchange interface information as they are running.

BRIEF DESCRIPTION OF THE DRAWINGS

The exemplary embodiments of the present invention will be readily appreciated and understood from consideration of the following detailed description of the invention, when taken with the accompanying drawings, in which same numbered elements are identical and.

DETAILED DESCRIPTION

Figure 1:
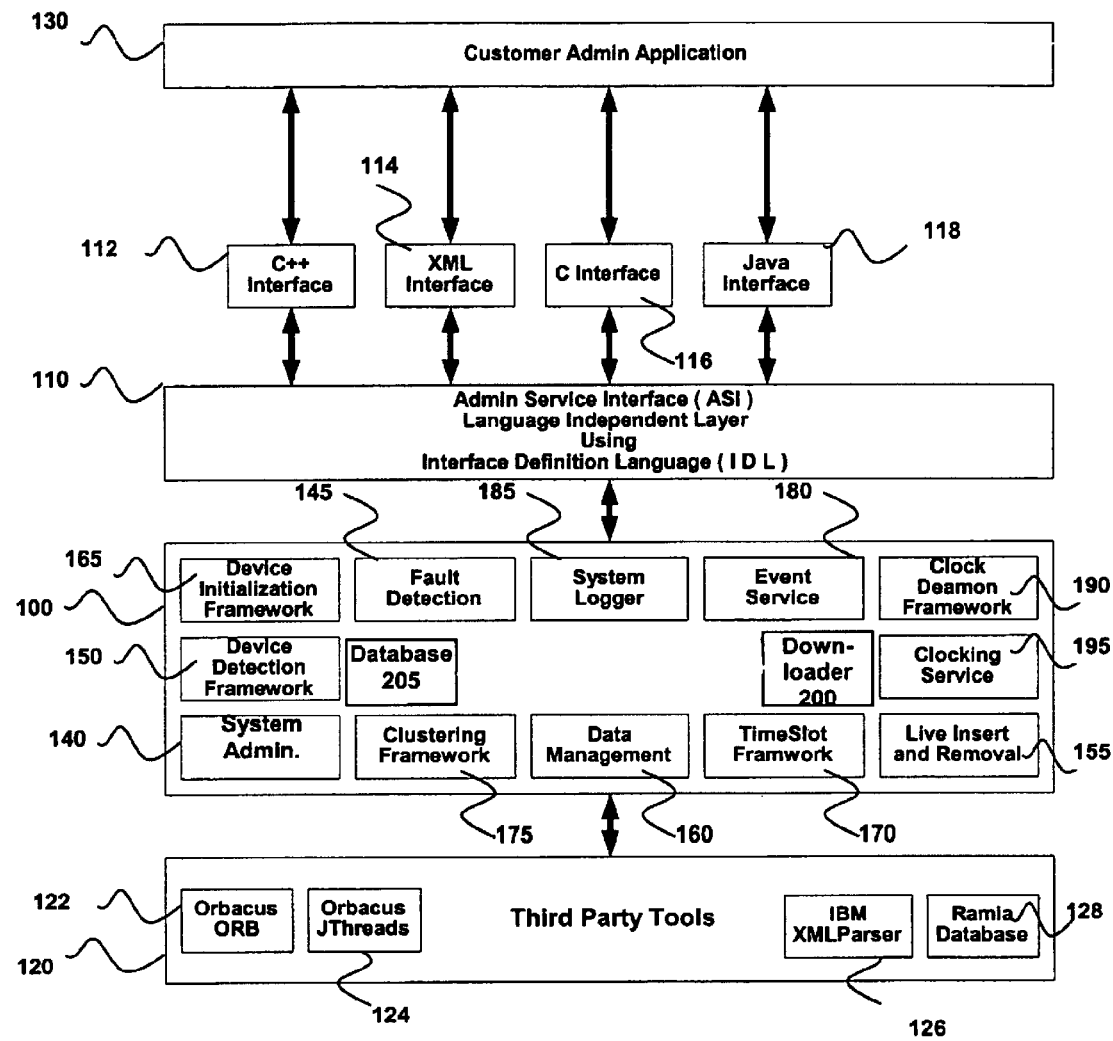
FIG. 1 illustrates an administrative framework designed in accordance with at least one of the embodiments of the invention.

For reference and clarification of the explanation of the exemplary embodiment of the invention, the following explanation of terminology is provided. An event service framework allows subsystems of a service system to send events to each other without having the supplier of the event be required to know the consumers of the event. A consumer is any entity in the event service framework that receives asynchronous events by registering for the event. A supplier is any entity in the event service framework that injects events into the event service framework. A channel is the event service entity that couples consumers with supplier events. A device is a computer telephone device, e.g., a hardware card.

Cross platform administrative frameworks designed in accordance with embodiments of the invention provide extensible, generic frameworks to perform administrative functions. Such cross platform administrative frameworks provide architectural mechanisms for administrative software that performs administration, configuration, system initialization, fault monitoring and event notifications in a system for providing various services, i.e., a service system.

Such event service frameworks may also enable translation into a single source code base for all operating systems. As a result, development time for operating systems may be reduced along with product cycles and maintenance efforts.

These event service frameworks may make use of and/or be compatible with standards-based CORBA. Utilizing CORBA provides a fault tolerance framework, a distributed system, interprocess communication, cross-platform tools and multithreading policies. CORBA provides the underlying framework for the cross platform frameworks designed in accordance with at least one embodiment of the invention. As a result of implementing the framework using CORBA, these frameworks may provide improved system fault tolerance.

These event service frameworks may also allow for implementation of systems in a distributed manner, e.g., based on distributed programming network principles. As a result, the event service frameworks may serve as mechanisms to solve problems associated with administration and configuration of remote systems.

These event service frameworks may also provide high availability rather than a specific entry level of ability provided by Windows NT based architecture.

The structure of these event service frameworks may also provide the ability to easily extend the event service framework to include new technologies using plug-in applications. As a result, new technologies may be integrated into the frameworks more easily.

Such event service frameworks may also provide the ability to replace components that perform clocking and time slot management.

Administrative frameworks designed in accordance with the embodiments of the invention may be used to provide cross platform solutions for system initialization, configuration, management and fault monitoring for a service system. The administrative frameworks designed in accordance with at least one embodiment of the invention may support various operating system versions including, for example, LINUX starting with Redhat version 6.2, Solaris™ versions 7 and 8, and Windows™ 2000.

FIG. 1 illustrates an administrative framework designed in accordance with at least one of the embodiments of the invention. As shown in FIG. 1, the administrative framework 100 is coupled to both an administrative service interface language independent layer 110 using an interface definition language and also to various third party tools 120. The administrative system interface 110 may also be coupled to various interfaces including a C++ interface 112, an eXtensible Markup Language (XML) interface 114, a C interface 116 and a Java interface 118. Each of these interfaces 112–118 may provide a mechanism for communication between the administrative system interface 110 and a customer administration application 130.

The administrative system interface 110 provides a facade that enables clients to manage the event service system. The administrative system interface 110 component saves the client from dealing with the CORBA interfaces, which are used by the administrative framework 100. The administrative system interface 110 provides a mechanism to specify and retrieve configuration attributes for devices, start and stop the service system and retrieve and specify time slot information. The constituent interfaces of the administrative system interface 110 can be categorized into initialization, device management and time slot management categories. All calls into the administrative system interface 110 may go through to the system controller (explained below) for further processing.

The various third party tools 120 may include, for example, an ORBacus™ ORB 122, Orbacus™ Java threads 124, an IBM XML parser 126, a Ramia Database 128, etc.

The administrative framework 100 may include a system administrative subsystem 140, a fault detection subsystem 145, a device detection framework 150, a live insertion/removal subsystem 155 (supported by a live insertion/removal server), a data management subsystem 160, device initialization framework 165 various technology specific utilities including a time slot assignment utility (which may be uspported by one or more servers) 170, a clustering utility 175, an event service framework 180, a system logger 185, various libraries, and replaceable management applications, e.g., a clock daemon framework 190 and a clocking service 195, a downloader framework 200 and a database 205. These subsystems, frameworks, components, utilities, libraries and applications participate in the administrative framework by performing specific functions.

Plug-in frameworks for a device detection application or for a device initialization application, associated with the device detection framework 150 or device initialization framework 165 illustrated in FIG. 1, respectively, need not expose any CORBA implementation to the customer. The detection frameworks may be mainly responsible for device detection and retrieval of device configuration information in the case of a device detection application or device initialization and retrieval for the device initialization application. Both a detector C++ application and an initializer C++ application may be system-specific or a third party detector application supplied by an external customer.

Administrative frameworks designed in accordance with at least one embodiment of the invention, e.g., administrative framework 110 illustrated in FIG. 1, may maintain a large quantity of system initialization and configuration data. As administrative framework software may grow from a downloader to ELHA to high availability, such data may increase from simple one-time configuration data to a large quantity of run-time data as well. As a result, a service system may have increased utility as a result of incorporating a centralized data storage device(s) to store data reliably.

The event service framework 180 allows service system subsystems to send events to each other without having the supplier of the event be required to know the consumers of the event. However, the event service framework 180 may also include an event notification service that may provide the capability of a user-friendly layer on top of the service, which may make the service more easily usable. This event service framework 180 may make use of an event mechanism provided by a CORBA ORB vendor.

A database 205 may be used in the administrative framework 100 and supplied as part of the administrative framework 100. This administrative framework database 205 may be used, for example, if there is a need for centralized, persistent and reliable storage for all administrative framework data. Alternatively, the database 205 may be used if there is a need for a database that is cross-platform and is not tied down to operating system specific abstractions such as file system, etc. Moreover, the use of such a database 205 may be advisable if the administrative framework 100 utilizes a large quantity of relational data. Further, as administrative frameworks evolve, the administrative data may increase due to additional system requirements and functionalities. As a result, such a database structure may provide necessary room for growth.

The system administrative subsystem 140 is the entry point into the administrative framework 100. The administrative service interface 110 uses the system administrative subsystem 140 to perform specific administrative functions. The system administrative subsystem 140 may be implemented as a collection of services that perform various system functions. The primary role of this subsystem 140 is the initialization of administrative services and invocation of appropriate services for performing administrative activities.

Figure 2:
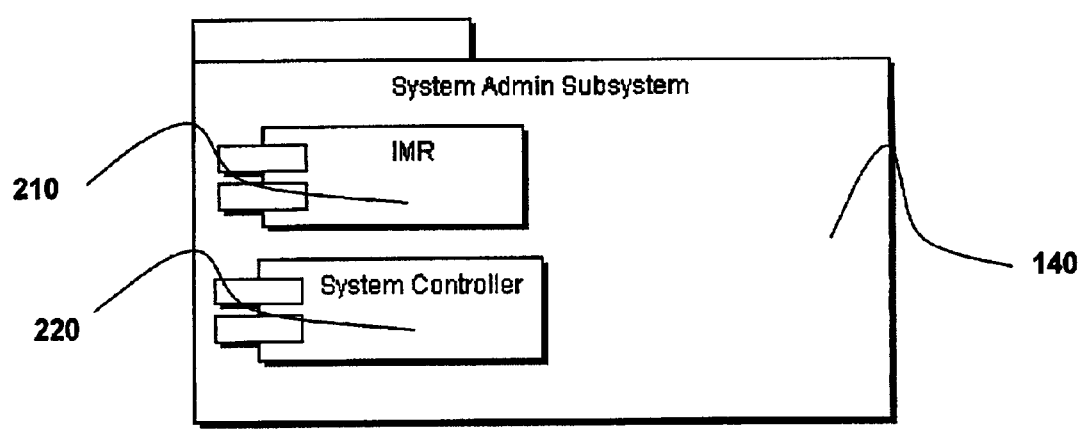
FIG. 2 illustrates one implementation of the system administrative subsystem illustrated in FIG. 1.

An embodiment of the system administrative subsystem 140 is illustrated in FIG. 2 in greater detail. As shown in FIG. 2, the IMR 210 may be needed to manage both system startup and shutdown. The IMR 210 may control the system startup via a system configuration file written XML and may be invoked on system startup by RC script on a UNIX platform. Otherwise, the IMR 210 may be an NT/2000 service that may be automatically started by the system controller 220. As a result, the NT/2000 service may have the responsibility of starting up all the administrative services in the appropriate sequence during system startup.

The system controller 220, which may be supported by one or more servers, may be responsible for various system level functionality in the administrative framework 110 (illustrated in FIG. 1). For example, all requests from the customer administration application 130, illustrated in FIG. 1, via the administrative system interface 110 may first arrive at the system controller 220. The system controller 220 may have the responsibility of handling requested tasks by delegating the requests to appropriate services for action. While doing this, the system controller 220 may apply necessary business logic and system level synchronization rules required to process the requests. The system controller 220 may also consume and manage live insertion and removal events. The system controller 220 may also load and manage system configuration data via a XML file.

The system controller 220 may synchronize and manage the service system's business rules and logic using various system level synchronization rules that may be applied to accept, reject or block system requests coming into the administrative framework, e.g., during system detection, when a customer request for a system shutdown gets rejected, etc. All requests from the administrative system interface 110 may be handled by the functionality of the system controller 220. Given an administrative system interface request, the controller 220 may mediate the request by finding and invoking the appropriate services that are responsible for such a requested functionality.

The system controller 220 may also handle live, device insertion or removal events via eventing framework (which may include a CORBA implemented event notification service) included or utilized by the event service framework 180 (explained in detail below). Depending on the state of the administrative framework 100, the system controller 220 may be responsible for processing the live, device insertion or removal events.

The fault detection subsystem 145 illustrated in FIG. 1 may include a fault detector proxy loader component and a fault detector proxy component. The fault detector proxy loader component is the component that initiates fault detection. The fault detection subsystem 145 may be a collection of components that aid in the detection of, for example, Time Division Multiplexing (TDM) bus faults and processor failures.

Figure 3:
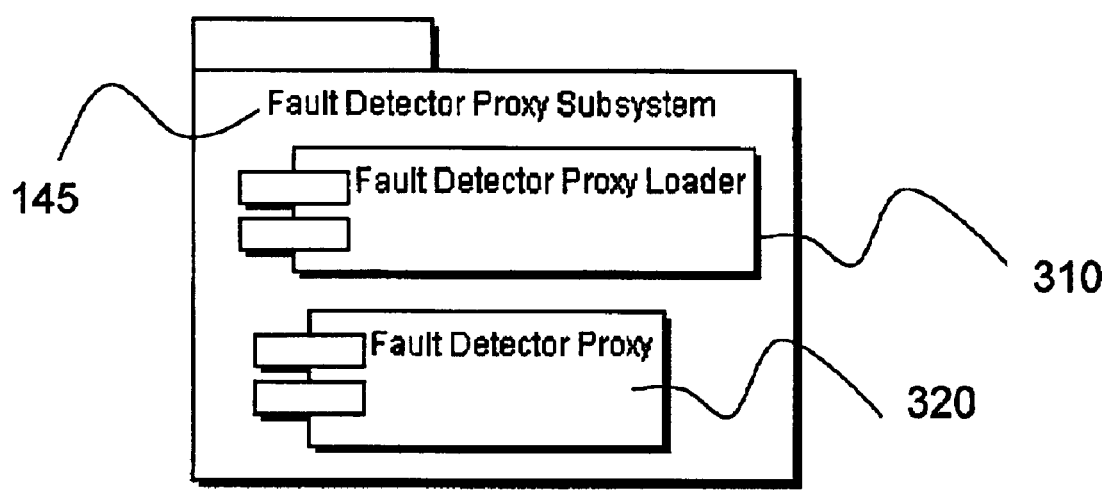
FIG. 3 illustrates one implementation of the fault detection subsystem (also referred to as the fault detector proxy subsystem) illustrated in FIG. 1.

FIG. 3 illustrates one implementation of the fault detection subsystem (also referred to as the fault detector proxy subsystem) 145 illustrated in FIG. 1. The fault detector proxy loader component 310 may be configured to listen for events, e.g., initialization of the processors and configuration of the TDM bus and may be configured to initiate fault detection proxies. The loader component 310 may also be configured to monitor the event service system at all times and may have the responsibility of starting up fault detectors to compensate for the possibility of fault detector proxies crashing for some reason.

The fault detector proxy component 320 may be configured to be the component that starts up during system startup. The fault detector proxy loader component 310 may also be configured to control the fault monitoring startup. The fault detector proxy component 320 may monitor processor faults and TDM bus faults by talking to an operating system kernel. The proxy component 320 may be configured to communicate these faults to the rest of the administrative framework 100 via the event service framework 180 (as illustrated in FIG. 1). The proxy component 320 may be configured to start monitoring the processor faults when triggered by the system monitor (supported by, for example, a system monitor server) upon a download processor complete event. The proxy component 320 starts monitoring the TDM bus faults when triggered by the proxy loader component 310 upon a bus configuration complete event.

The device detection framework 150 illustrated in FIG. 1 may be configured to be responsible for detecting devices and storing the device information in the framework-specific database 205. The services of this device detection framework 150 may be invoked during auto-detection of devices at system startup. The services may also get invoked during a live insertion and removal event.

Figure 4:
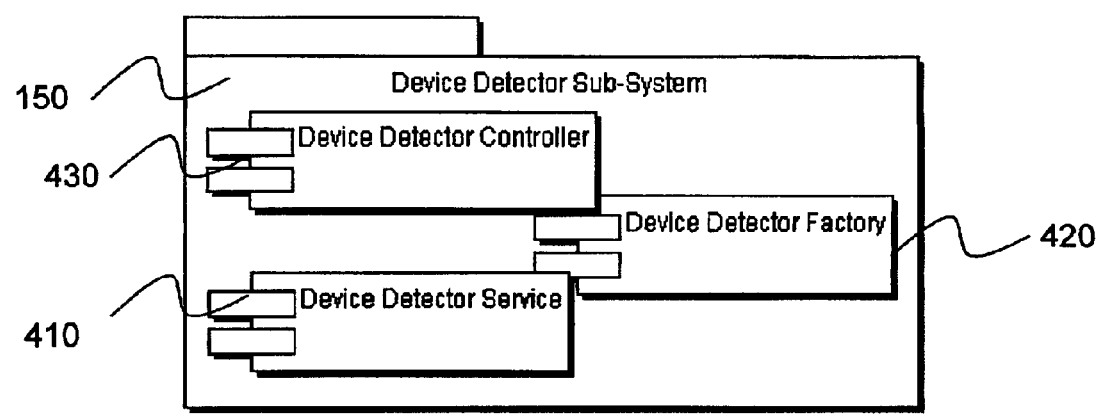
FIG. 4 illustrates one implementation of the device detection framework illustrated in FIG. 1.

FIG. 4 further illustrates one exemplary implementation of the device detection framework 150 illustrated in FIG. 1. As illustrated in FIG. 4, such an implementation may include a device detector service 410, device detector factory 420 and a device detector controller 430. Each of these components may be supported by one or more servers. The detector service 410 may provide an interface for the detector controller 430 to initiate device detection. The detector service 410 may be a technology specific component. The detector service 410 may have the responsibility of detecting the devices present on the system and updating the database 205 via the device data manager (as explained in more detail below with reference to FIG. 7).

The device detection framework 150 may be supported by one or more device detection servers.

For every technology supported by the framework, a specific detector factory 420 may be implemented and registered with the detector controller 430. The main task of the detector factory 420 may be to create and control the life cycle of the detector service 410.

The detector service 410 may be configured to gather the device capabilities and updates the database with the discovered device. The detector service 410 may also be configured to perform the requested action and terminate that action. The detector service 410 may also be the component that actually performs device detection at the physical level. The detector factory 420 may be the component that creates the requested detector component for the specific instance of detection activity. The detector controller 430 may be a service that controls the process of detection of devices. Any business rules or logic to be applied during the process of detection may reside in the detector controller 430.

A library of the device detection framework 150 may include, for example a detector controller server component that provides a mechanism for the administrative framework 100 to locate and communicate with a device detector application via a CORBA mechanism. The library of the device detection framework 150 may be, for example, a C++ library that is linked by an associated detector application. This framework 150 may run under its own thread that is managed by the ORB.

The device detection framework 150 may communicate with a corresponding detector application via a detection controller adaptor. The detection controller adapter may be a C++ abstract class that defines the generic interfaces that a detection application must implement to participate in the detection functionalities. The detector framework 150 may communicate with the administrative framework, e.g., administrative framework 100 illustrated in FIG. 1, requests to the detection application by adapting to the adapter interfaces.

An adaptor agent detection sub-framework may also be used, e.g., a library, which is a subsystem of the device detection main framework. Customer applications are not required to extend this sub-framework. However, DM3 and springware detection applications required to make use of this sub-framework.

A device detection controller adaptor agent may also be implemented, which is a virtual base class that is implemented by the Detection Application. The actual device detection for DM3 and Springware devices may be implemented here. Each adaptor agent runs in its own thread of execution that is different from the device detection controller adaptor. The adaptor agent is instantiated by the device detector factory 420 that maintains a pool of these agents. Since each agent runs in its own thread of execution, parallel detection of devices can be accomplished.

A detector customer application configuration framework automatically registers with the device detector controller 430. Therefore, adding a third party detector component is easy since the detector framework register itself with the administrative frameworks' detector controller.

Figure 5:
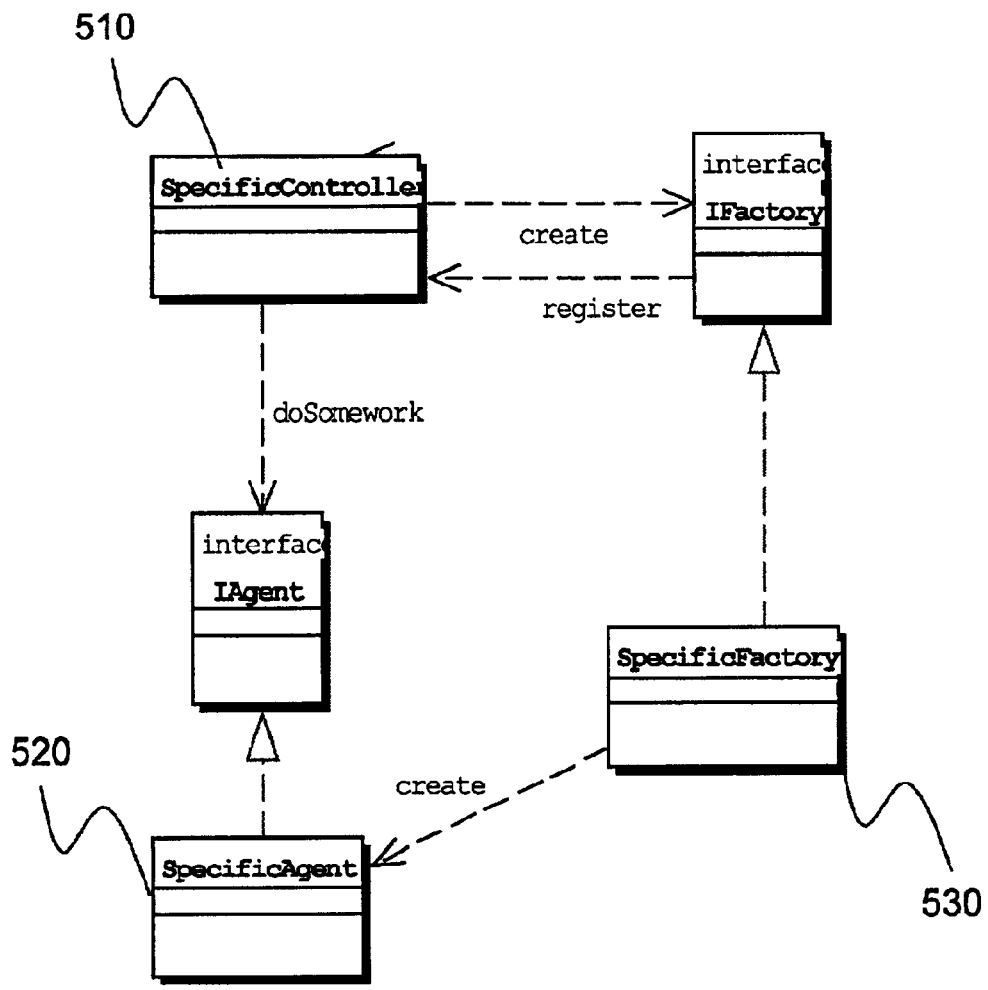
FIG. 5 is illustrates a controller factor pattern that may provide a configuration for one implementation of the components in the device detection framework illustrated in FIG. 1.

The components in the device detection framework 150 may be configured to follow a controller factory pattern, e.g., the controller factory pattern illustrated in FIG. 5. The factory pattern allows the administrative framework to abstract different types of technologies. Two examples of such abstractions may be found in the detection and initialization subsystems 150, 165, respectively.

FIG. 5 includes a class diagram that depicts a generic view of the classes participating in the factory pattern. The controller component 510 may be configured to serve as an entry point for a customer application and is responsible for the creation of the agent 520 that may be configured to be responsible for implementing a particular request. In addition, the controller component 510 may be responsible for applying certain business rules that are related to the requested operation. The controller component 510 may also create the agent (i.e., service object) 520 by identifying the proper factory component 530 that is responsible for the creation of the agent 520. Note, in this context, the agent 520 and service syntax are equivalent. Additionally, the factory component 530 may be responsible for registering itself with the controller component 510.

The factory pattern illustrated in FIG. 5 solves various problems including isolation of the functionality associated with technology downloading. As a result of isolating the downloading functionality, maintenance and troubleshooting are simplified. Additionally, the use of such a factory pattern ensures that a downloader controller incorporated in the downloader framework 200 is not concerned with technology related objects. As a result, ease of maintenance is improved. To add a new technology into the downloader framework 200, a developer may simply create the pattern given for the new technology. The rest of the system need not be disturbed.

The use of factories adds more flexebility for future operation. For example, factories can keep count of the all created objects. As a result, this information can be used for gathering statistics about how many downloaders are employed at any given time. As a result, a load balancing infrastructure may then be implemented to make use of this information.

Figure 6:
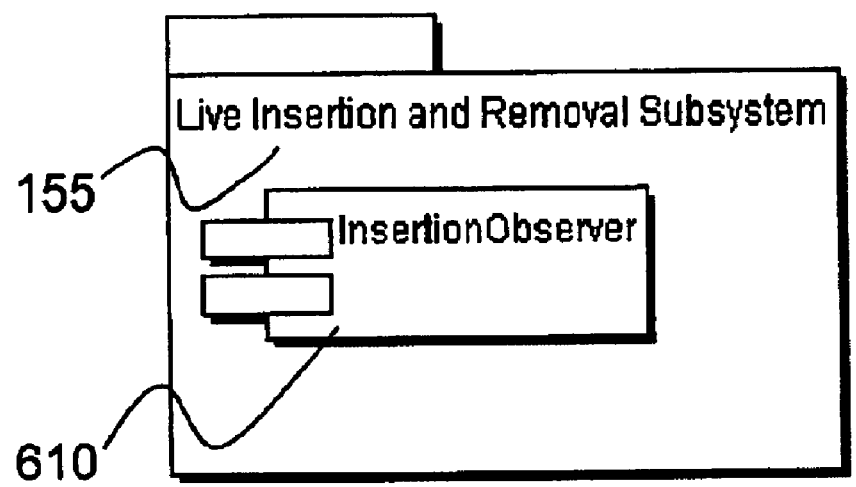
FIG. 6 illustrates one implementation of the live insertion/removal subsystem illustrated in FIG. 1.

FIG. 6 further illustrates one exemplary implementation of the live insertion/removal subsystem 155, including, for example, one or more live insertion/removal servers. As illustrated in FIG. 6, such an implementation includes a live insertion/removal observer 610, which may be configured to be responsible for live, device insertion and removal. This observer component 610 may be the first administrative component that knows of devices coming into and going out of the service system. The observer component 610 may be configured to then notify the rest of the administrative framework 100 (illustrated in FIG. 1) by sending an event through the event service provided by the event service framework 180 illustrated in FIG. 1.

Figure 7:
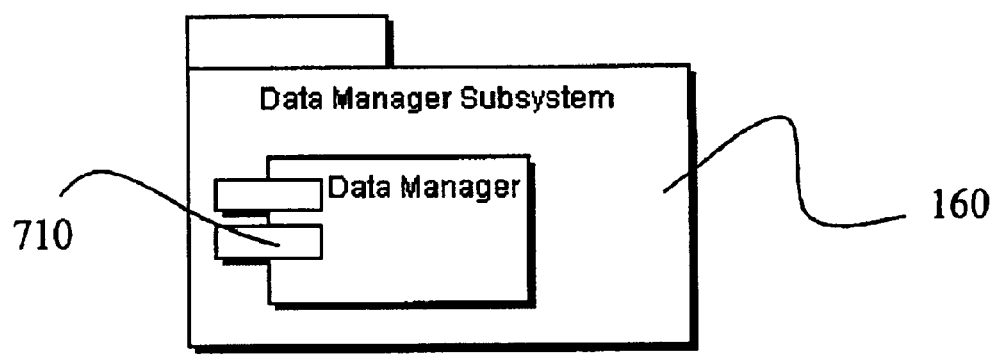
FIG. 7 illustrates one implementation of the data management subsystem illustrated in FIG. 1.

FIG. 7 further illustrates one exemplary implementation of the data management subsystem 160 illustrated in FIG. 1. As illustrated in FIG. 7, such an implementation may include a device data manager 710 (that may be supported by one or more servers), which may be implemented as a layer sitting on top of the database 205 illustrated in FIG. 1. The data manager 710 may be configured as a persistent service and may be initialized at system startup. Any engine associated with the database 205 and libraries may be cross-platform.

The data manager 710 may provide data retrieval and storage functionality. This data manager 1110 also handles all the device related data actions, e.g., inserting new data, retrieving existing data, deleting and updating device data in the database 705. By incorporating the data manager component 710 in the administrative framework 100, the database 205 may be insulated from direct access by other administrative components. In other words, administrative components need not and may not be permitted to access the database 205 directly. Rather, the device data manager 710 may be the single point of entry into the database 205 both for data storage and retrieval. With such a configuration, all administrative components need not be required to write database specific code.

Additionally, external customers need only access the database 205 via administrative framework business components, never needing to directly access the database 205. Another advantage resulting from this insulation is that changes to the database 205 only require that the device data manager 710 be altered accordingly. As a result, the interfaces between the device data manager 710 and the other administrative components, which are much more numerous and difficult to manage, may continue unchanged.

Figure 8:
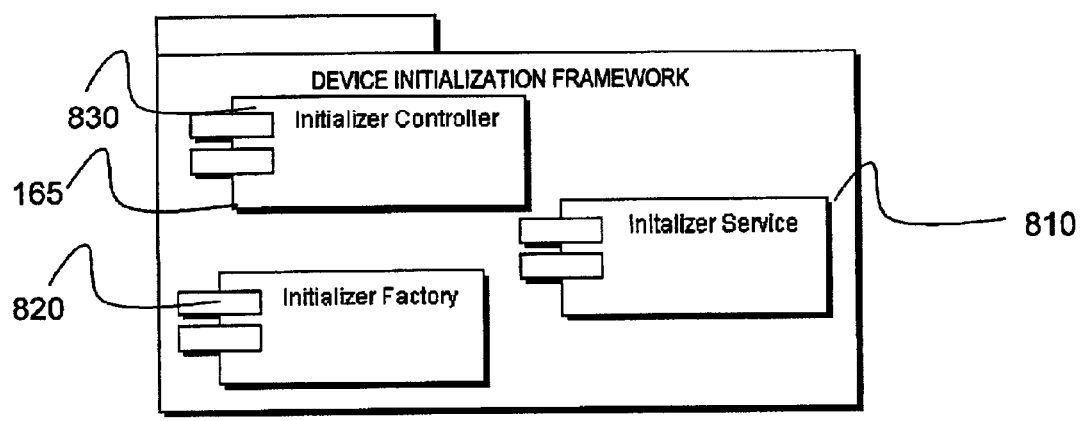
FIG. 8 illustrates one implementation of the device initialization framework illustrated in FIG. 1.

FIG. 8 further illustrates one exemplary implementation of the device initialization framework. The device initialization framework 165 includes components and services that aid in the initialization of devices. Services provided by this framework may be invoked during initialization and live, device insertion/removal scenarios. The components in this framework may be configured to follow the controller factory patterns described above with reference to FIG. 5. As illustrated in FIG. 8, such an implementation may include at least one initialization service 810, at least one initialization factory 820 and an initialization controller 830, each of which may be supported by one or more servers.

The one or more initialization services 810 may perform technology-specific initialization of devices. The one or more initialization factories 820 may be configured to create these technology-specific initialization services. The initialization controller 830 may be configured to apply business rules on how to initiate the initialization of multiple technologies so as to control the initialization of these technology-specific initialization services.

The factories 820 may be configured to create the requested initialization components for the specific instances of initialization activity. The initialization services 810 may be the components that actually perform the initialization at the physical level. The initialization services 810 may be configured to perform the requested actions and terminate those actions.

The controller 830 may be configured to also locate the appropriate technology initialization service 810 to perform the requested initialization task by using the initialization factories 820. The controller 830 may also support a service that controls the process of downloading via the downloader framework 200 of FIG. 1. Any business rules or logic to be applied during that process of initialization may reside in the controller 830.

The plug-in framework for the device initialization (i.e., downloading) does not expose any CORBA implementation to the customer. The initialization framework 165 (of FIGS. 1 and 8) is mainly responsible for device downloading and other initialization steps. For example, DM3 initialization process is composed of DM3 device firmware downloading, device cluster allocation and virtual device configuration via a RegVox application.

The initialization framework library may contain an initializer controller server component that provides a mechanism for the administrative framework 100 (of FIG. 1) to locate and communicate with the initialization application via a CORBA mechanism. The initialization framework 165 may be a C++ library that gets linked by the initialization application. This initialization framework may run under its own thread that is managed by the ORB POA. The initialization framework may communicate with the initialization application via a device initializer controller adaptor. An initializer controller server component may expose various interfaces, e.g., InitializeAll, InitializeDevice, UninitializeAll, UninitializeDevice, etc.

The initialization controller adapter may be, for example, a C++ abstract class that defines the generic interfaces that an initializer application must implement to participate in the initialization functionalities. The framework may communicate administrative framework requests to the initialization application by adapting to adapter interfaces.

The initialization framework may also use an adaptor agent intialization subframework, which is a library. Customer applications are not required to extend this subframework. However, DM3 and Springware initialization applications are required to make use of this sub-framework. The initialization adaptor agent is a virtual base class that is implemented by the initialization application. The actual device initialization for DM3 and Springware devices may be implemented here. Each initialization adaptor agent runs in its own thread of execution that is different from the device initialization controller adaptor. The initialization adaptor agent is instantiated by the device initialization factory that maintains a pool of these agents. Since each agent runs in its own thread of execution, parallel device initialization (i.e., downloading) can be accomplished.

A device initialization customer application configuration framework automatically registers with the main administrative framework initialization framework 165 (illustrated in FIG. 1). Therefore, adding a third party initializer component is simple and manageable via this framework.

Returning to FIG. 1, the time slot assignment framework 170 may be configured to be used to initialize time slots required for various devices in the service system. This timeslot assignment framework 170 may be invoked during service system initialization after the devices have been started up. This assignment framework 170 may also interface with a time slot manager application included in the replaceable management applications discussed below to claim or release time slots. The timeslot assignment framework 170 may be used for, for example, Springware™ timeslot assignment.

The clustering framework 175 illustrated in the administrative framework 100 shown in FIG. 1 may be used for DM3 clustering. The clustering framework 175 may be configured to perform clustering of components on the devices in the service system. The clustering framework 175 may include, for example, a utility that is executed upon service system startup once the initialization of the constituent devices is complete. The clustering framework 175 may also interact with the device data manager 710 of the data management subsystem, e.g., 160, illustrated in FIG. 7, to retrieve cluster configuration parameters. The framework 175 may also be configured to interact with the time slot assignment framework 175 to claim or release time slots.

The event service framework 180 may be configured to provide event notification for the service system. The event service framework 180 may utilize a model that includes channels, suppliers and consumers for event notification.

The system logger 185 may be configured to log information, errors and other messages sent by components belonging to the administrative framework 100 illustrated in FIG. 1. The system logger 185 may provide a service that allows for components of the administrative framework 100 to log informational, warning and error messages.

As illustrated in FIG. 1, the administrative system interface 110 is the interface that provides administrative functionality including, for example, device management, timeslot allocation, etc. The administrative system interface 110 forwards calls from the customer administrative application 130 to the system administrative subsystem 140.

The administrative system interface 110 may also be used by customers that are external to the service system so that the customers may manipulate the administrative framework 100. The administrative system interface 110 may also work in combination with and utilize an Simple Network Management Protocol (SNMP) agent that may expose administrative interfaces that can be invoked to perform administrative related activities, e.g., starting and/or stopping devices, diagnosing devises, etc. The administrative system interface may also shield out these customers from the ORB and other layers of the administrative framework.

Such an SNMP agent and a language specific wrapper library may be linked with an administrative system interface library (not shown). Such a library may be utilized by the system controller 220 of the system administrative subsystem 140 to retrieve administration commands. As such, such an administrative system interface library may be configured as a single entry point for all administration functionalities.

The timeslot assignment framework 170, clocking daemon framework 190 and clocking service 195 may be service replaceable management applications that may be implemented as administrative plug-in applications. Each of these applications may be thought of as a customer of the administrative framework. The clock daemon framework 190 may be configured to provide a service that configures the bus once the devices have been detected. The clock daemon framework 190 may also apply rules to the device capabilities and arrive at a bus configuration. The daemon framework 190 may also interface with the device data manager 710 of the data management subsystem 160 illustrated in FIG. 7 to retrieve and save time slot data configurations.

Administrative frameworks designed in accordance with at least one the exemplary embodiments of the invention may utilize a mechanism for identifying and advertising services, i.e., a naming service. Such a mechanism allows customers to discover services provided by the framework. The naming service provided by the ORB vendor may be used to implement this advertising and resolving service.

Applications not belonging to administrative framework can be invoked during system startup and shutdown. External customers to the administrative framework 100 illustrated in FIG. 1 have at least two ways to hook to the framework. First, an executable application may be written and added to a system configuration file. Second, a plug-in application may be implemented using CORBA.

If an external customer has an executable application written and added to the system configuration file, third party executable applications may be integrated into the administrative framework. Thus, a system configuration XML file may allow a system administrator to enter control information related to system/device starts and stop sequences. The system administrator may also able to enter various types of control information including what applications are to be run during system initialization and shutdown, when the applications are to be run, command line options (if any), and specification of system global parameters.

The attached Appendix includes an XML file representing one implementation of the configuration files for a cross-platform administrative framework designed in accordance with at least one exemplary embodiment of the invention. This XML file contains global definitions, system startup sequences and initialization rules.

In accordance with the second way of hooking up external customers to the framework, e.g., implementing a plug-in application/framework, the clock daemon, time slot administration, device detection, and device initialization frameworks may all implement a CORBA component, i.e., a CORBA servant, that may be used by the administrative framework to locate requested services and communicate.

The CORBA implementation may be hidden from the customer. As a result, the customer may be spared from having to understand CORBA concepts in detail. In addition, all of these four frameworks, i.e., clock daemon, time slot administration device detection and device initialization frameworks, may have a default implementation that may be a configuration provided with the administrative framework. The customer can choose to replace the clock daemon and time slot manager applications with its own implementation by simply linking with their respective framework libraries. In addition, the customer can also hook up their technology device detection and initialization applications. This allows the administrative frameworks to handle third party devices.

A plug-in framework for the clock daemon application need not expose any CORBA implementation to the customer. Rather, the clock daemon application may be system-specific, a customer-developed or a third-party clock daemon application. The administrative framework does not have to differentiate between these clock daemon applications.

Figure 9:
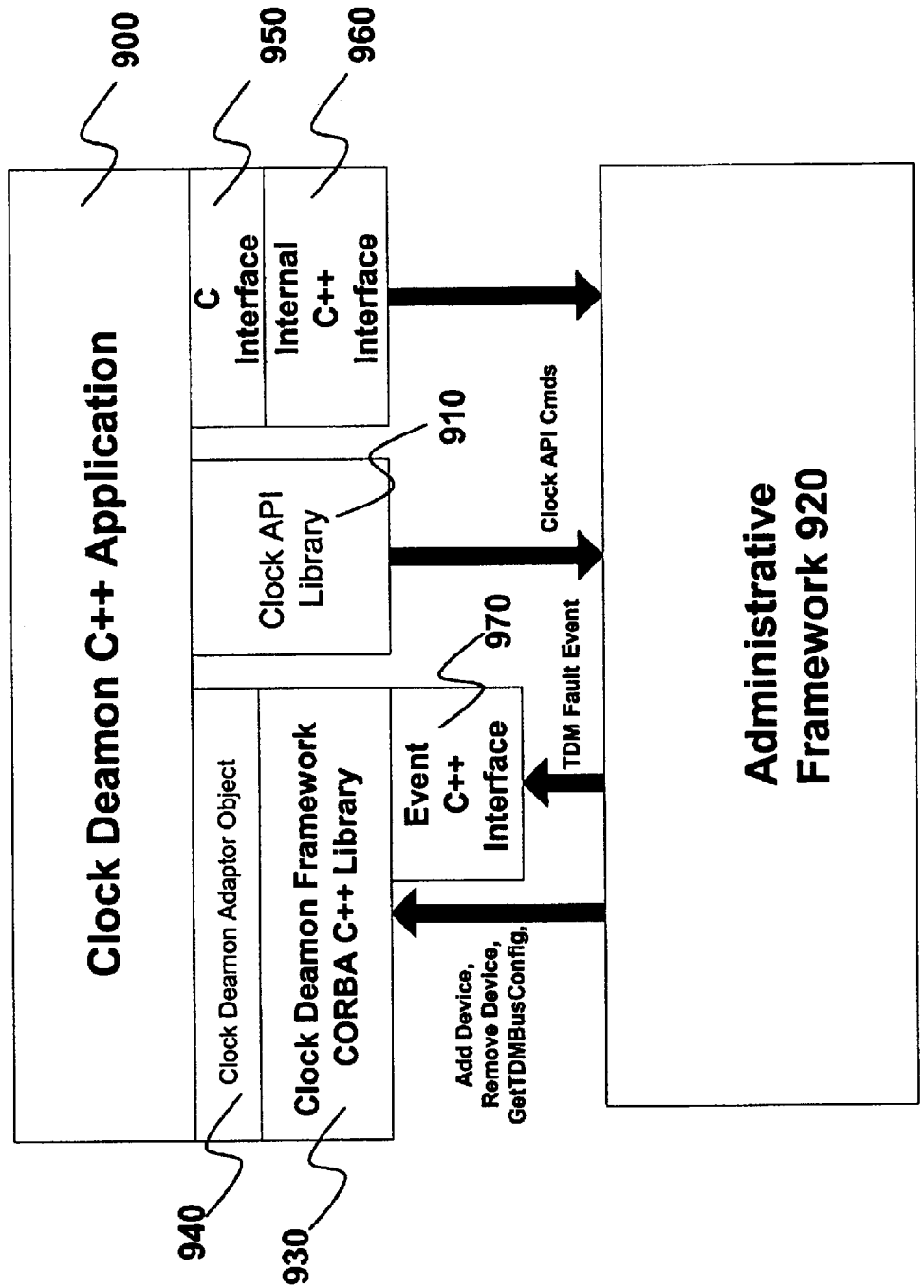
FIG. 9 illustrates one example of a clock daemon application running on top of a clock daemon framework.

The configuration shown in FIG. 9 illustrates one example of a clock daemon application 900 running on top of a clock daemon framework. The clock daemon application 900 may use a clock API library 910 to communicate clocking API commands to the hardware included in the administrative framework 920. The clock daemon framework library 930 may provide a mechanism for the administrative framework 920 to locate and communicate to the clock daemon application 900 via a CORBA mechanism. The framework of the clock daemon framework library 930 may be a C++ library that gets linked by the clock daemon application 900. The clock daemon framework may contain a clock daemon proxy server that allows the administrative framework 920 to locate and communicate with the clock daemon application via the clock daemon adapter object 940.

The clock daemon adapter object 940 may be a C++ abstract class that defines the generic interfaces that a clock daemon application implements to participate in the clock daemon functionalities. The administrative framework 920 may be configured to communicate administrative framework requests to the clock daemon application 900 by adapting to the adapter interfaces, e.g., the C interface 950, administrative service interface Internal C++ interface 960 and event C++ interface 970.

Figure 10:
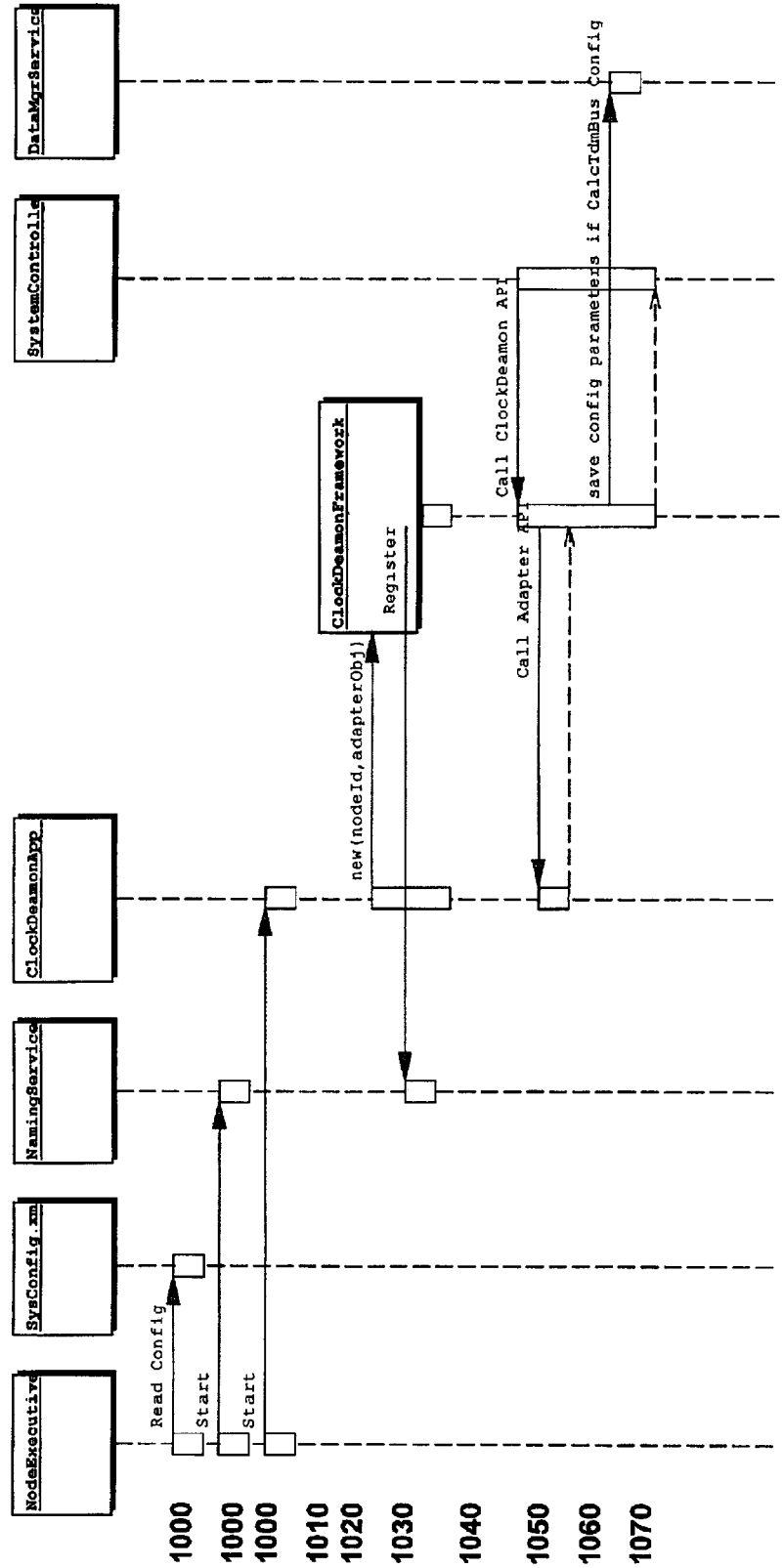
FIG. 10 depicts a high level conceptual depiction of an exemplary framework object interaction with a generic clock daemon framework.

FIG. 10 depicts a high level conceptual depiction of an exemplary framework object interaction with a generic clock daemon framework. As shown in FIG. 10, at 1000, the IMR is controlled to start up the naming service and all admin servers in the order given in the system configuration file written in, e.g., XML, and control proceeds to 1010. In the case of the clock daemon application, upon startup, the clock daemon application may instantiate the clock daemon framework object. The clock daemon application must supply the domain name or IP address of the system host and the adapter object to the clock daemon framework, e.g., clock daeomon framework 190 illustrated in FIG. 1. This is performed at 1020 and control proceeds to 1030. The clock daemon framework then creates a thread that binds to the ORB and registers the clock daemon CORBA service with the naming service at 1030. Control then proceeds to 1040, at which point the clock daemon application waits for a request from the administrative framework, e.g., administrative framework 100 illustrated in FIG. 1.

The system controller, e.g., the system controller included in the system administrative subsystem 140 of FIG. 1, can then find the clock daemon via the naming service. Once the system controller has a reference to the clock daemon framework service, it can make calls to its interface at 1050 via the CORBA interface. The clock daemon framework may also use the adapter object to delegate the actual request to the clock daemon application.

At 1060, the clock daemon application may perform Time Division Multiplexing (TDM) calculations, using the data manager service, e.g., the data manager service 710 of the data management framework 160 illustrated in FIG. 7. Control then proceeds to 1070, at which the clock daemon framework saves the new TDM configuration in the administrative framework database. The downloader controller, e.g., included in the downloader 200 in the administrative framework 100 of FIG. 1 may use this information.

Figure 11:
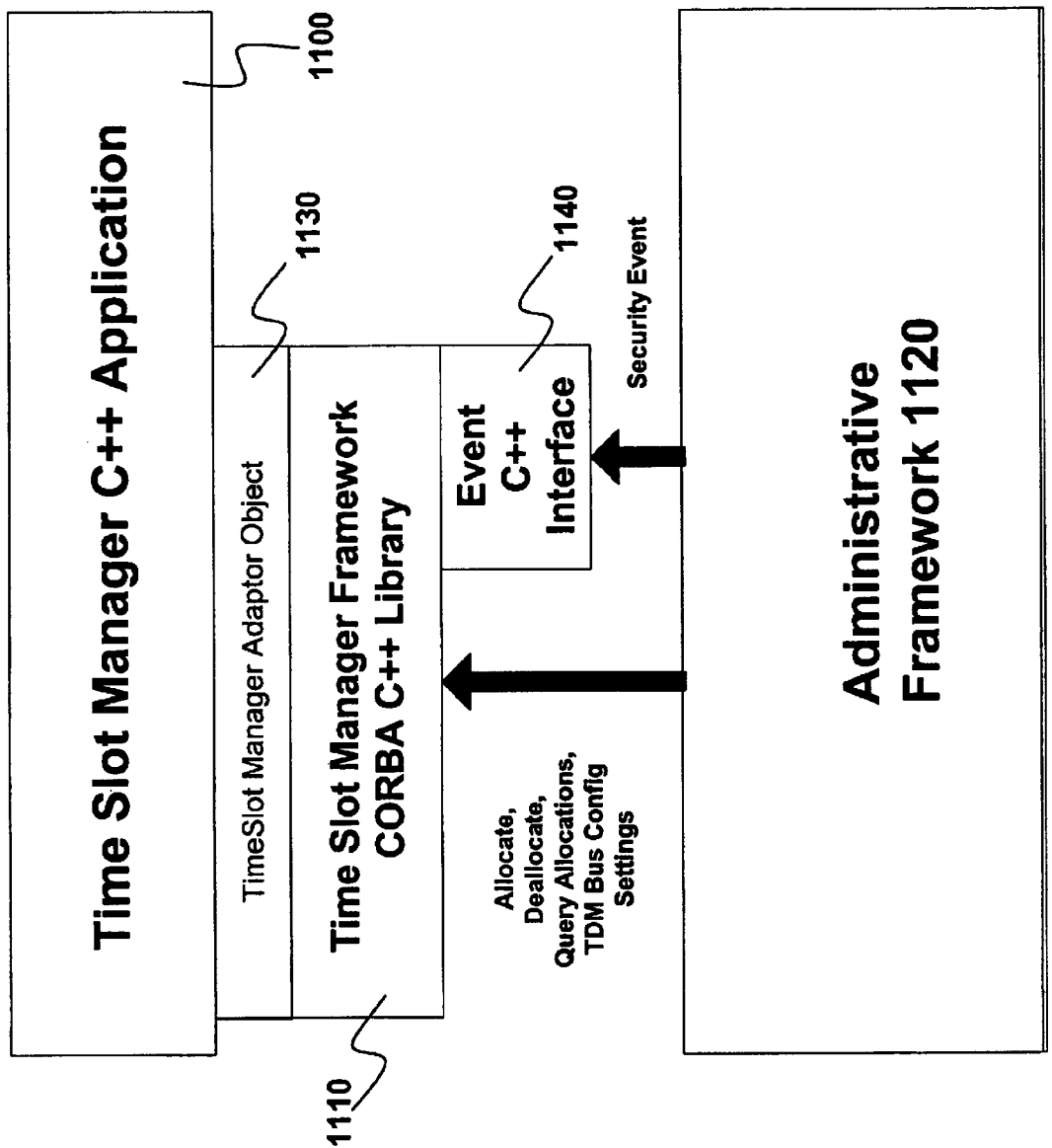
FIG. 11 illustrates one exemplary time slot manager daemon application running on top of the time slot manager framework.

FIG. 11 illustrates one exemplary time slot manager daemon application 1100 running on top of the time slot manager framework 1110 (which may be supported by one or more servers). The plug-in framework 1110 for the time slot manager does not expose any CORBA implementation to the customer. The time slot manager daemon may be implemented as an internal system-specific time slot manager or a customer-implemented time slot manager. The framework 1110 need not differentiate between these two alternative implementations.

The library included in the time slot manager daemon framework 1110 provides a mechanism for the administrative framework 1120 (e.g., the administrative framework 100 illustrated in FIG. 1) to locate and communicate with the time slot manager daemon application 1100 via a CORBA mechanism. The time slot manager daemon framework 1110 may be a C++ library that gets linked by the time slot manager application 1100. The framework may contain a time slot manager daemon proxy server that allows the administrative framework to locate and communicate with the time slot manager daemon via the time slot manager daemon adapter 1130.

The time slot manager adapter 1130 may be a C++ abstract class that defines the generic interfaces that a time slot manager daemon application 1100 must implement to participate in the time slot manager functionalities. The time slot manager framework 1110 may communicate administrative framework requests to the time slot manager application by adapting to the adapter interfaces, e.g., the event C++ interface 1140.

The configuration for the external time slot manager daemon may be specified by the system administrator in the system configuration XML files similar to the clock daemon. The configuration may be the executable name and command line options.

Returning to the IMR illustrated as part of the system administration subsystem 140 illustrated in FIG. 2, the IMR is the application that starts up the naming service and all the administrative framework servers in the order given in the system configuration file written in, e.g., XML. In the case of the time slot manager daemon application, the time slot manager daemon application upon startup, instantiates the time slot framework object. The application must supply the domain name or IP address of the system host. The time slot framework creates a thread that binds to the ORB and registers this CORBA service with the naming service. At this point, it waits for time slot management request from the administrative frameworks or run time applications. An application can allocate or deallocate time slot interfaces to the time slot manager application via the time slot framework. The time slot framework makes use of the time slot manager adapter object to carry the actual commands. The customer who wishes to override the default system-specific time slot manager application may implement the adapter object.

When a device is to be stopped either from an explicit API command or from a live, device removal request, a particular protocol sequence of commands is executed, i.e., a stop device protocol. This protocol is designed to allow external applications to clean up their respective applications to account for a removal or stopping of a device. For example, during device removal, the protocol may be implemented when a device is about to be stopped.

Figure 12:
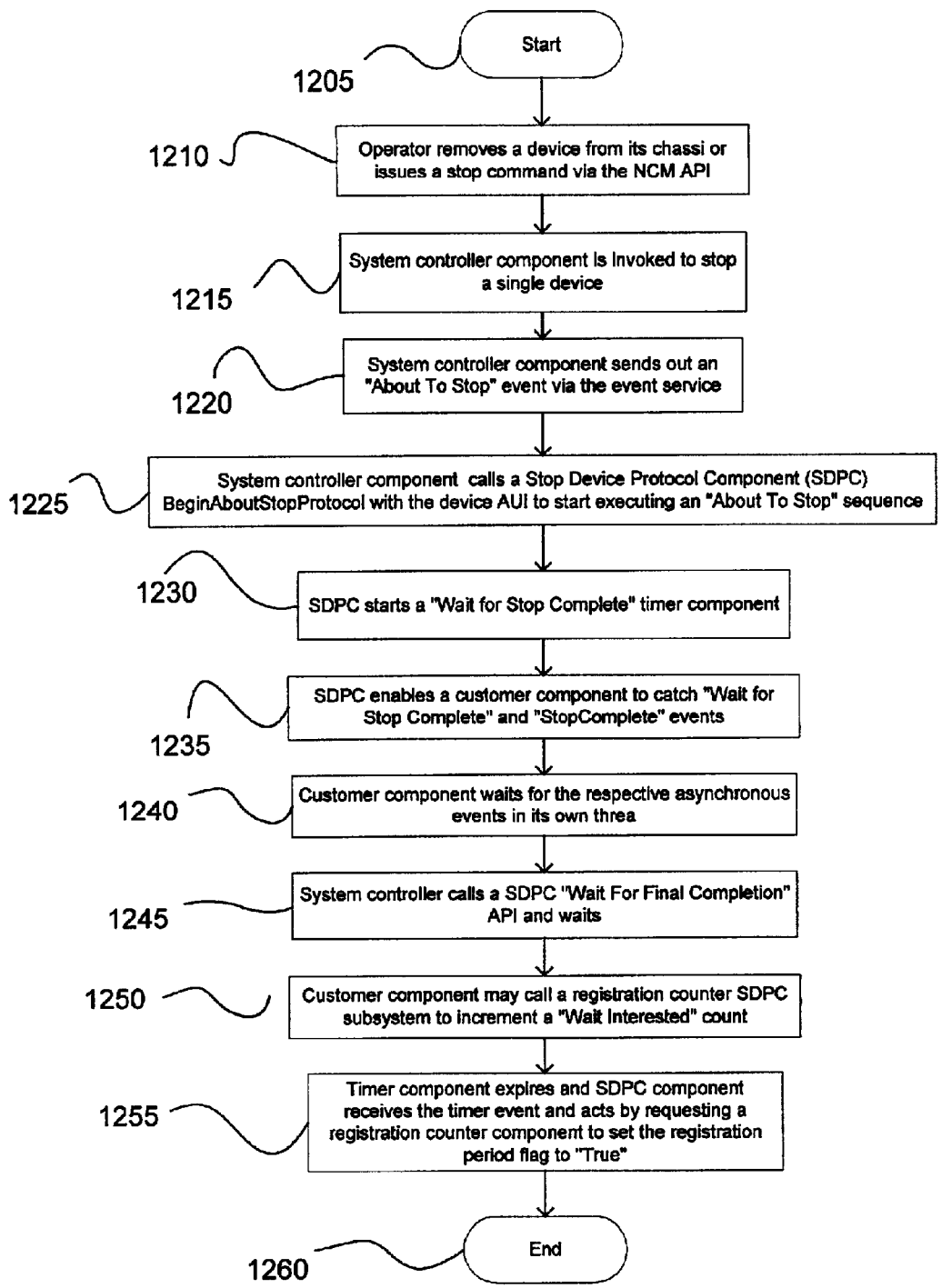
FIG. 12 illustrates one example of a method for implementing the stop device protocol.
Figure 13:
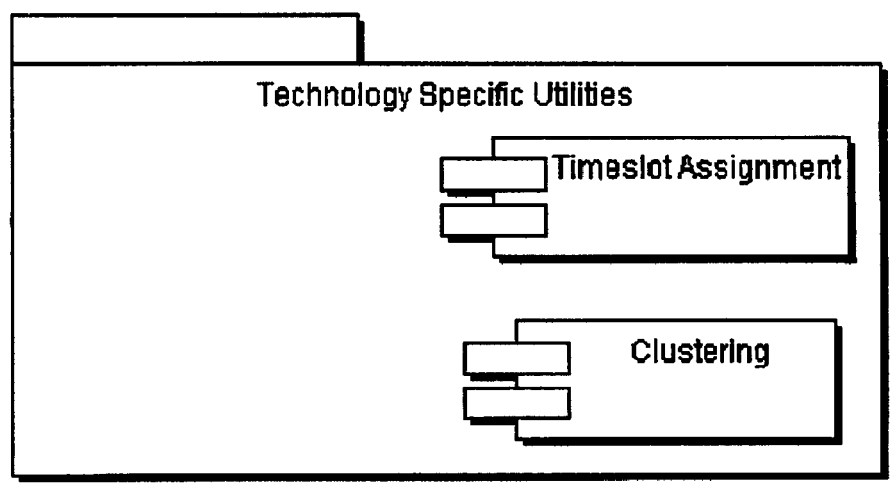
FIG. 13 illustrates technology specific utilities according to an embodiment of the present invention.
Figure 14:
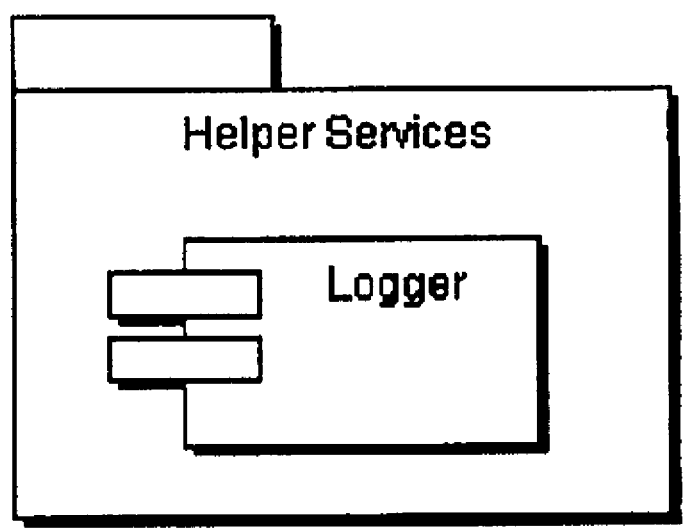
FIG. 14 illustrates helper services subsystem according to an embodiment of the present invention.
Figure 15:
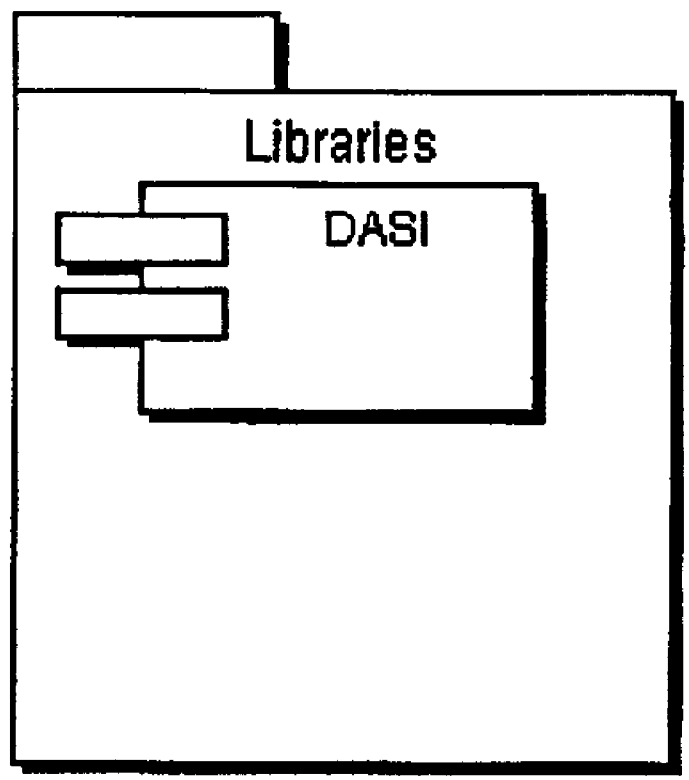
FIG. 15 illustrates libraries subsystem according to an embodiment of the present invention.
Figure 16:
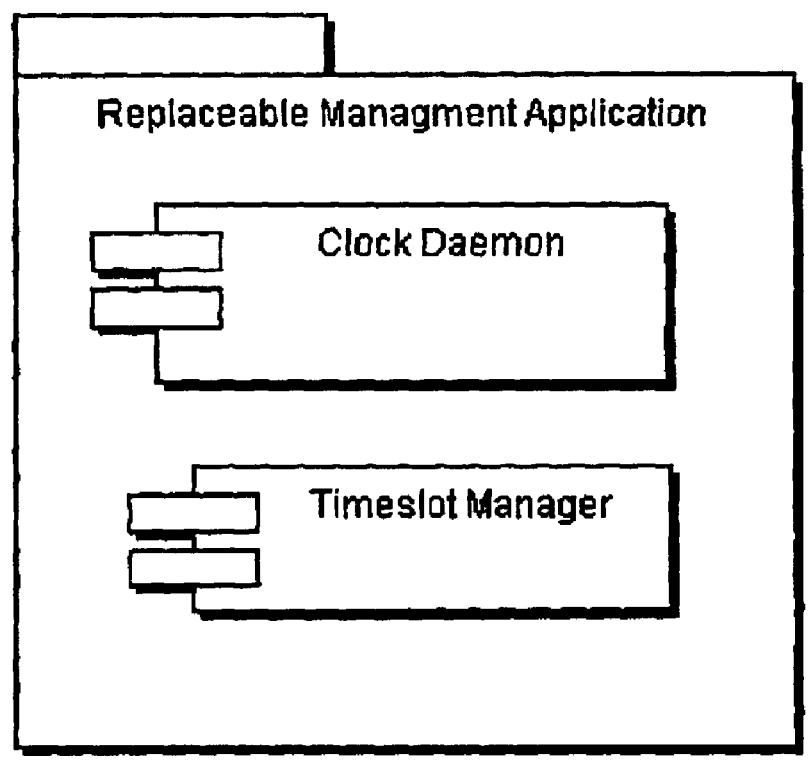
FIG. 16 illustrates a replaceable management application subsytem according to an embodiment of the present invention.
Figure 17:
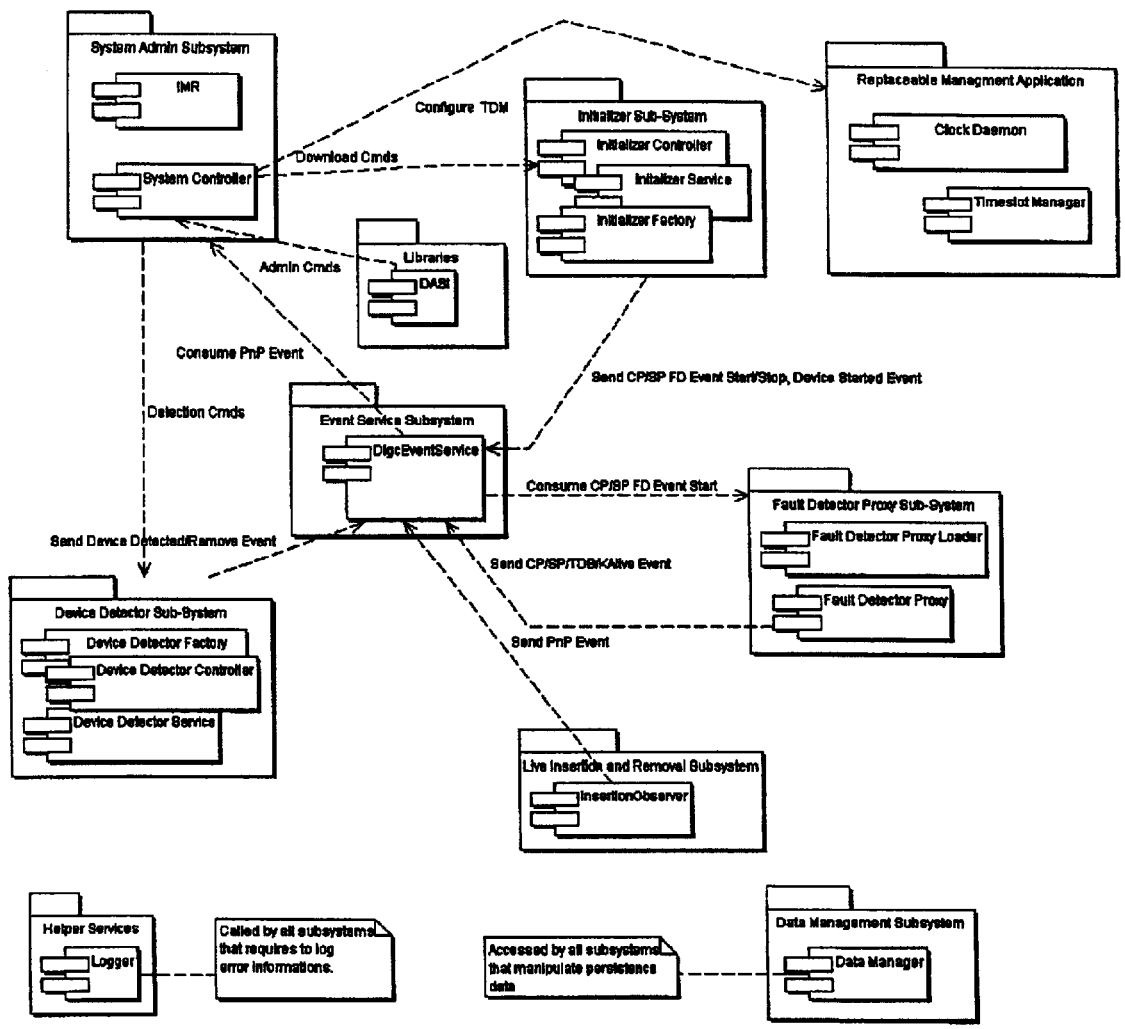
FIG. 17 illustrates an event service system according to an embodiment of the present invention.

One example of a method for implementing the stop device protocol is illustrated in FIG. 12. As shown in FIG. 12, the method begins at 1205, and control proceeds to 1210 at which an operator removes a device from its chassi or issues a stop command via the NCM API. Subsequently, at 1215, the system controller component is invoked to stop a single device. Control then proceeds to 1220, at which the system controller component sends out an "About To Stop" event via the event service. The event carries a Device Addressable Unit Identifier (AUI).

The AUI allows the administrative framework to uniquely identify service system entities. These entities may range from a physical device to processors, recorders, players etc. Conventionally, the AUI includes a combination of the family name and the device name. To the contrary, in accordance with the exemplary embodiments of the invention, the AUI is simply a sequential key generated by the database engine. The sequential key may be an unsigned long value, which is sufficiently large to guarantee uniqueness. The AUI can only be obtained via certain function calls to the device data manager subsystem.

In accordance with the exemplary embodiments of the invention, any customer or subsystem that manipulates administrative framework resources uses the AUIs when calling into the device data manager The device data manager may build its data relations based on the AUIs and may allow various query types based on AUIs. The node ID may be incorporated in the AUI.

Control then proceeds to 1225, at which the system controller component included in the system administration subsystem calls a Stop Device Protocol Component (SDPC) BeginAboutStopProtocol with the device AUI to start executing an "About To Stop" sequence.

The SDPC may be a cross platform component that may be implemented, for example, as a DLL in Windows™, as a LIB.SO in UNIX, etc. The SDPC may be composed of a SDPC controller and a customer component. The SDPC controller component may expose all external interfaces used by customers such as the system controller. The SDPC may start the "About To Stop Protocol" sequence process.

Control then proceeds to 1230, at which the SDPC starts a "Wait for Stop Complete" timer component, which is set with a predefined value. Any customer application interested in the "About to Stop" event, must answer back as soon as they received this event. Sending a "Wait for Stop Complete" event via the event service does this. Control then proceeds to 1235, at which the SDPC enables a customer component to catch "Wait for Stop Complete" and "Stop-Complete" events. The customer component is an event service consumer that consumes events generated by those applications that participate in the "About to Stop" protocol. Such events may relate to whether clean up has been completed. The SDPC returns control back to the system service component. Note that the customer component may run in its own thread.

Control then proceeds to 1240, at which the system controller calls a SDPC "Wait For Final Completion" API and waits. The "Wait For Final Completion" simply waits for a semaphore to be raised by the SDPC when the entire stop protocol method has been executed.

Control then proceeds to 1245, at which the customer component waits for the respective asynchronous events in its own thread. At 1250, for each "Wait For Stop" event received, this customer component may call a registration counter SDPC subsystem to increment a "Wait Interested" count. This count must be protected with some kind of synchronization object. The customer component performs continuous listening for its assigned event until the timer expires.

When the timer component expires, at 1255, the SDPC component receives the timer event and acts by requesting a registration counter component to set the registration period flag to "True". Control then proceeds to 1260, at which these operations for implementing the stop device protocol end.

The registration period flag may be used later on to determine the state of the "Stop Wait Complete" phase. The timer component must be abstracted in order for it to run in multiple platforms. This component may be added in the OS layer subsystem. In this framework, two timers may be created and monitor the time that external applications have to register themselves with the SDPC subsystem and the maximum time that those applications have to complete the stop device cleanup.

It should be understood that various events are generated by the administrative framework including clocking event messages, hardware processor faults, system administration event messages, device administration event messages, stop device protocol events and internal framework exclusive events.

Clocking event messages may include events generated by the administrative framework's fault detection subsystem 145 indicating that various lines on various buses of when the PLL are bad. Potential event customers for such events include the clock daemon framework and clock daemon application. Hardware processor faults may include events generated by the administrative framework's fault detection subsystem 145 that indicate when various processors on a board fail.

System administration event messages may include events generated by the system controller 220 (of FIG. 2) included in the system administration subsystem 140 (of FIG. 1) that indicate when the system has started, e.g., after detection and initialization of all devices, the system has stopped, e.g., all devices have stopped, before the system has started, before the system engages in a stop sequence. Potential event customers for such events include any customers that are external.

Device administration event messages may include events generated by the detector service 410 (illustrated in FIG. 4) included in the device detection framework 150 (illustrated in FIG. 4) that indicate when a new device is detected and the device configuration is read from the hardware or when a device is removed. Additionally, device administration event messages may include events generated by the system controller 220 included in the system administration subsystem 140 (of FIG. 2) that indicate when a device is initialized, when a device is stopped, just before the device initialization process is engaged, just before the device is stopped, etc. Potential customers for such events include any customers that are external Stop device protocol events may include, for example, events generated by any external customers participating in an about to stop device protocol.

Internal framework exclusive events may include events generated by one or more initializer servers supporting the device initialization framework 165 (illustrated in FIG. 1) to advise one or more system monitor servers (supporting the system administrative subsystem 140 of FIG. 1) to either start or stop a fault detector component associated with a server supporting the device initialization framework 165.

While this invention has been described in conjunction with the specific embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

For example, a system error framework may be included in the administrative frameworks designed in accordance with at least one exemplary embodiment of the invention. This system error framework may act as a mechanism that is used to identify errors, warning and other types of message IDs that are returned to a called party. Additionally, the system error framework may act as a mechanism for storing message strings that are associated with the message IDs.

Moreover, the cross platform frameworks designed in accordance with the exemplary embodiments of the invention may be used in conjunction with cross platform software. In developing such software, is may be beneficial to use XML to abstract file operations. Additionally, it may be advantageous to make use of all possible components from the ORB Vendor. Further, cross-platform database agents described in this framework may be advantageously used. Moreover, the Jthread cross-platform library API may be beneficially used for all threads, semaphores, mutex, and other thread synchronization components. It may be easier to ensure a cross-platform framework by minimizing operating system specific calls. Also any part of the software code that cannot be made operating system independent should be abstracted using "#define" etc. . . .

APPENDIX

```
*/
<AdminConfigRoot>
    /*
        This is the System Configuration Global Parameters Section. Default values
        are in bold letters.
    DoAutoDetection      set to false to skip auto detection. Otherwise set to true.
    DoAutoDeviceInit     set to false to skip device initialization. Otherwise set to true.
    */
    <SysConfigParams>
        <DoAutoDetection>    true/false    </DoAutoDetection>
        <DoAutoDeviceInit>   true/false    </DoAutoDeviceInit>
    </SysConfigParams>
    /*
This section contains all the servers that must be started by the IMR. The order of execution
is defined by the order of definition. Each Server section contains a Path tag that identifies
the application that must be started with the command line defined under the CmdLine tag. If
the Server is a CORBA Server and a Fault Tolerance server, then the RunningInstance tag
should be set to a value bigger then one. A CORBA Server uses the ORB to bootstrap to the
ORB framework. A CORBA Server serves as a host for CORBA components (i.e., CORBA
servants). The max value allowed is 5.
    */
    <SystemStartup>
        <Server>
            <Path>              " "         </Path>
```

APPENDIX-continued

```
                <Cmdline>              " "       </Cmdline>
            <RunningInstances>
        </RunningInstances>
            </Server>
    </ServerStartup>
    /*
    This section describes the Initialization (Downloading) rules. The Initialization Controller
    and the Device Initialization Controller Framework typically process this section. User
    specifies what and when to run external application during the device initialization.
    */
    </DeviceInitalizationRules>
            /*
    Add here any external application that must be executed during Initialization process.
    Note only one value is allow per tag.
                                    Technology - { *, DM3, Springware } [Note *= applies to all technologies]
    Product - {*, . . .}
    RunLevel - { "PRESTART", "POSTSTART", "PRESTOP", "POSTSTOP" }
    Frequency - {"SYS_INIT", "PER_DEVICE", "ANY_TIME"}
                    */
    <ExternalApplication>
                            <Path         " "           </Path>
                            <Cmdline>     " "           </Cmdline>
    <RunLevel>      " "             </RunLevel>
                            <Technology>   " "            </Technology>
                <Product>      " "           </Product>
    <Frequency>     " "             </Frequency>
        </ExternalApplication>
    </DeviceInitalizationRules>
    </AdminConfigRoot>
            The following is a simple example of the System XML Configuration File.
    <AdminConfigRoot>
            <SysConfigParams>
                    <DoAntoDetection>       true     </DoAutoDetection>
                    <DoAutoDevicelnit>      true     </DoAutoDeviceInit>
            </SysConfigParams>
    <SystemStartup>
            <Server>
                            <Path>              "/Dialogic/bin/NamingServer.exe"      </Path>
                            <Cmdline>           "-OBPort 2400"
            </Cmdline>
                            <RunningInstances>    1
            </RunningInstances>
                    <Server>
    <Server>
                            <Path>              "/Dialogic/bin/SystemCtl.exe"     </Path>
                            <Cmdline>           "-OBPoolSize 20"               </Cmdline>
                            <RunningInstances>    2
            </RunningInstances>
                    </Server>
    </ServerStartup>
    </DeviceInitalizationRules>
                    /* Run regvox.exe-v after the initialization all technology devices during
    System Init*/
    <ExternalApplication>
                            <Path>              "/Dilaogic/bin/regvox.exe"    </Path>
                            <Cmdline>           "-v"                          </Cmdline>
    <RunLevel>      "POST_START"            </RunLevel>
                            <Technology>        "*"                           </Technology>
                <Product>          "*"            </Product>
                <Frequency>        "SYS_INIT"     </Frequency>
        </ExternalApplication>
    /* Run regvox.exe-d after the initialization of a single technology device*/
    <ExternalApplication>
                            <Path>              "/Dialogic/bin/regvox.exe"    </Path>
                            <Cmdline>           "-d"                          </Cmdline>
    <RunLevel>      "POST_START"            </RunLevel>
                            <Technology>        "*"                           </Technology>
                <Product>          "*"            </Product>
                <Frequency>        "PER_DEVICE"                   </Frequency>
        </ExternalApplication>
    /* Run ipconFigureexe-g after initialization of DM3 technology devices during System Init
    only. */
    <ExternalApplication>
                            <Path>              "/Dialogic/bin/ipconFigureexe"    </Path>
                            <Cmdlme>            "-g"                              </Cmdline>
    <RunLevel>      "PRE_START"             </RunLevel>
                            <Technology>        "DM3"                         </Technology>
                <Product>          " "            </Product>
    <Frequency>     "SYS_INIT"              </Frequency>
```

APPENDIX-continued

```
    </ExternalApplication>
  </DeviceInitalizationRules>
</AdminConfigRoot>
```

We claim:

1. A cross platform administrative framework configured to manage administrative services in a service system, the administrative framework comprising:
   a system administrative subsystem operationally coupled to an administrative service interface and configured to provide an entry point into the administrative framework and perform at least one administrative function including initialization of administrative services and invocation of at least one service associated with performing administrative services;
   a data management subsystem, the data management subsystem including at least one device data manager implemented as a layer on a framework-specific database, configured as a persistent service and configured to provide data retrieval and storage functionality, handle all device related data actions;
   an event service framework configured to enable transmission of events without the supplier of the event being required to know the consumers of the event, wherein the administrative framework is not operating system specific; and
   a device detection framework configured to detect devices and store device information in the framework-specific database.

2. The administrative framework of claim 1, further comprising a fault detection subsystem including:
   a fault detector proxy loader component configured to initiate fault detection proxies, monitor the event service system and start up fault detectors; and
   a fault detector proxy component configured to start up during system startup, control a fault monitoring startup, monitor processor faults and TDM bus faults, communicate these faults to other components in the administrative framework via the event service framework and monitor processor faults when triggered by the system administrative subsystem.

3. The administrative framework of claim 1, further comprising a live insertion and removal subsystem including a live insertion and removal observer configured to manage live, device insertion and removal and notify at least one other component of the administrative framework by sending an event through the event service provided by the event service framework.

4. The administrative framework of claim 1, wherein the system administration subsystem includes a mechanism to manage both system startup and shutdown, the mechanism being configured to control the event service system.

5. The administrative framework of claim 1, wherein the administrative framework uses Common Object Request Broker Architecture as a software backend architecture and Common Object Request Broker Architecture specification standards to create, distribute and manage distributed program objects.

6. The administrative framework of claim 5, wherein an Object Request Broker manages service requests for a service associated with the administrative framework.

7. The administrative framework of claim 1, wherein the administrative framework is configured to provide extensible, generic frameworks to perform administrative functions and architectural mechanisms for administrative software configured to perform at least one of administration, configuration, system initialization, fault monitoring and event notifications in a system for providing at least one service.

8. The administrative framework of claim 1, wherein the administrative framework is configured to provide cross platform solutions for system initialization, configuration, management and fault monitoring for a service system.

9. The administrative framework of claim 1, coupled to an administrative service interface language independent layer configured to use an interface definition language.

10. The administrative framework of claim 9, wherein the administrative system interface is coupled to at least one language-specific interface selected from the group consisting of a C++ interface, an eXtensible Markup Language interface, a C interface and a Java interface.

11. The administrative framework of claim 10, wherein the at least one language-specific interfaces is configured to provide a mechanism for communication between the administrative system interface and a customer administration application.

12. A cross platform administrative framework configured to manage administrative services in a service system, the administrative framework comprising:
    a system administrative subsystem operationally coupled to an administrative service interface and configured to provide an entry point into the administrative framework and perform at least one administrative function including initialization of administrative services and invocation of at least one service associated with performing administrative services;
    a data management subsystem, the data management subsystem including at least one device data manager implemented as a layer on a framework-specific database, configured as a persistent service and configured to provide data retrieval and storage functionality, handle all device related data actions;
    an event service framework configured to enable transmission of events without the supplier of the event being required to know the consumers of the event, wherein the administrative framework is not operating system specific; and
    a device detection framework configured to detect devices and store device information in the framework-specific database the device detection framework including a device detector service, at least one device detector factory and a device detector controller,
    the device detector service being configured to provide an interface for the device detector controller to initiate device detection,
    the device detector service being configured to detect present devices and update the framework-specific database.

13. An event service system comprising:
    an administrative framework utilizing CORBA interfaces;
    an administrative system interface coupled to the administrative framework;

at least one language-specific interface coupled to the administrative system interface and configured to provide a mechanism for communication between the administrative system interface and a customer administration application;

wherein the administrative system interface is configured to enable clients to manage the event service system, and wherein the administrative framework includes:
- a system administrative subsystem operationally coupled to the administrative service interface and configured to provide an entry point into the administrative framework and perform at least one administrative function including initialization of administrative services and invocation of at least one service associated with performing administrative services;
- a data management subsystem, the data management subsystem including at least one device data manager implemented as a layer on a framework-specific database, configured as a persistent service and configured to provide data retrieval and storage functionality, handle all device related data actions;
- an event service framework configured to enable transmission of events without the supplier of the event being required to know the consumers of the event; and
- a device detection framework configured to detect devices and store device information in the framework-specific database.

14. The event service system of claim 13, wherein the administrative system interface is configured to allow a client to interact with the event service system without using CORBA interfaces utilized by the administrative framework.

15. The event service system of claim 13, wherein the administrative framework is coupled to at least one tool from the list consisting of an ORB, Java threads, an XML parser, and a Ramia Database.

16. The event service subsystem of claim 13, wherein the administrative framework further comprises a fault detection subsystem including:
- a fault detector proxy loader component configured to initiate fault detection proxies, monitor the event service system and start up fault detectors; and
- a fault detector proxy component configured to start up during system startup, control a fault monitoring startup, monitor processor faults and TDM bus faults, communicate these faults to other components in the administrative framework via the event service framework and monitor processor faults when triggered by the system administrative subsystem.

17. The event service system of claim 13, wherein the administrative framework further comprises a live insertion and removal subsystem including a live insertion and removal observer configured to manage live, device insertion device removal and notify at least one other component of the administrative framework by sending an event through the event service provided by the event service framework.

18. The event service system of claim 13, wherein the system administration subsystem includes a mechanism to manage both system startup and shutdown, the mechanism being configured to control the event service system.

19. The event service system of claim 13, wherein the administrative framework maintains system initialization and configuration data.

20. An event service system comprising:
an administrative framework utilizing CORBA interfaces;
an administrative system interface coupled to the administrative framework; and
at least one language-specific interface coupled to the administrative system interface and configured to provide a mechanism for communication between the administrative system interface and a customer administration application;
wherein the administrative system interface is configured to provide a mechanism to at least one of specify and retrieve configuration attributes for devices, start d stop the service system and retrieve and specify time slot information and to enable clients to manage the event service system, and
the administrative framework includes:
- a system administrative subsystem operationally coupled to the administrative service interface and configured to provide an entry point into the administrative framework and perform at least one administrative function including initialization of administrative services and invocation of at least one service associated with performing administrative services;
- a data management subsystem, the data management subsystem including at least one device data manager implemented as a layer on a framework-specific database, configured as a persistent service and configured to provide data retrieval and storage functionality, handle all device related data actions; and
- an event service framework configured to enable transmission of events without the supplier of the event being required to know the consumers of the event.

21. An event service system comprising:
an administrative framework utilizing CORBA interfaces;
an administrative system interface coupled to the administrative framework;
at least one language-specific interface coupled to the administrative system interface and configured to provide a mechanism for communication between the administrative system interface and a customer administration application;
wherein the administrative system interface is configured to enable clients to manage the event service system, and
the administrative framework includes:
- a system administrative subsystem operationally coupled to the administrative service interface and configured to provide an entry point into the administrative framework and perform at least one administrative function including initialization of administrative services and invocation of at least one service associated with performing administrative services;
- a data management subsystem, the data management subsystem including at least one device data manager implemented as a layer on a framework-specific database, configured as a persistent service and configured to provide data retrieval and storage functionality, handle all device related data actions;
- an event service framework configured to enable transmission of events without the supplier of the event being required to know the consumers of the event; and a device detection framework configured to detect devices and store device information in the framework-specific database, the device detection framework including a device detector service, at least one device detector factory and a device detector controller, the device detector service being configured to provide an interface for the device detector controller to initiate device detection, the device detector service being configured to detect present devices and update the framework-specific database.

* * * * *